United States Patent Office 2,852,427
Patented Sept. 16, 1958

2,852,427

2-PIPERONYLOXAZOLIDINE, PROCESS AND USE AS CONTROL FOR MICROORGANISMS

Jamal S. Eden, Painesville, Ohio, assignor to Diamond Alkali Company, Cleveland, Ohio, a corporation of Delaware No Drawing. Application December 5, 1956
Serial No. 626,283

7 Claims. (Cl. 167—33)

This invention relates to 2-piperonyloxazolidine, its preparation and application.

The compound of this invention which has the structure

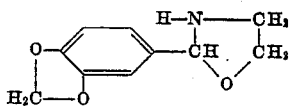

may be prepared by chemically combining piperonal and monoethanolamine, e. g., by refluxing for several hours, preferably in an organic solvent such as butanol or other alkanol solvent as methanol, ethanol, propanol or the like, or aromatic solvent such as toluene, xylene, benzene, or the like.

This compound is biologically active and exhibits utility in various applications wherein such activity is advantageous, e. g., as toxicants for use in controlling various microörganisms, as an insecticide, plant growth regulant, and the like.

In order that those skilled in the art may more completely understand the present invention and the preferred methods by which the same may be carried into effect, the following specific examples are offered:

EXAMPLE I

*Preparation of 2-piperonyloxazolidine*

50 gms. (0.33 mol) of piperonal is dissolved in butanol and 20.4 gms. (0.33 mol) of monoethanolamine is slowly added. The mixture is refluxed for six hours and the butanol is then removed by distillation. The residue solidifies on cooling to room temperature. This material is recrystallized twice from butanol and once from benzene to yield 7 gms. of a solid material melting at 55.5°–57° C. Chemical analysis of this product is as follows indicating the preparation of the desired $C_{10}H_{11}NO_3$.

| Element | Actual (Percent by wgt.) | Calculated (Percent by wgt.) |
|---|---|---|
| C | 62.17 | 62.18 |
| H | 5.61 | 5.70 |

EXAMPLE II

The product of Example I is employed as a fungicide in spore germination tests against 7 to 10 day old cultures of organisms *Alternaria oleracea* and *Sclerotinia fructicola* in slide germination tests. In this test, the product of Example I, at concentrations, in water, of 1000, 100, 10 and 1.0 p. p. m. (prior to dilution of four volumes with one volume of spore stimulant and spore suspension), as employed. Germination records are taken after 20 hours of incubation at 22° C. by counting 100 spores. The results of this procedure indicate that a 50% spore germination inhibition (E. D. 50 value) is obtained at a concentration of 100–1000 p. p. m.

EXAMPLE III

Using the product of Example I for the control of tomato Late Blight fungus (*Phytophthora infestans*) in a spray test as an aqueous formulation at a concentration of 2000 p. p. m., wherein approximately 150,000 sporangia of *P. infestans* per ml. are applied via spray to tomato plants. Observation is made after exposure for 24 hours at 60° F. and 100% relative humidity and 2 to 4 days in a greenhouse. It is observed that a complete control of the blight infection is obtained.

EXAMPLE IV

To illustrate the phytotoxicity of the product of Example I aqueous formulations of this compound are sprayed on growing tomato and bean plants in 4 inch clay pots, at a dose of 250 mg. per 4" diameter pot. The tomato plants are killed and the bean plants are severely injured, thus indicating a high degree of biological activity.

EXAMPLE V

To illustrate effectiveness of the compound of Example I as a bactericide, this compound is employed against the organisms *Erwenia amylovora*, *Xanthomonas phaseoli*, *Staphylococcus aureus* and *Escherichia coli* via a 4 hour exposure to the compound as an aqueous formulation at a concentration of 1000 p. p. m. It is observed that ratings at B, B, B, and A, respectively, are obtained against the foregoing organisms thus indicating a high degree of bacterial growth inhibition.

EXAMPLE VI

Using the product of Example I, insecticidal tests are carried out against the Mexican bean beetle as a test organism on cranberry bean plants. In this test, the product of Example I is used as a 25% wettable powder dispersed in water to provide a concentration of 1% active chemical. The cranberry bean plants are dipped therein and allowed to dry at which time untreated insects are caged thereon. A 90% insect mortality is observed 48 hours after such treatment together with severe plant injury, thus indicating a high degree of insecticidal activity via stomach poison action and phytotoxicity.

It will be appreciated that it is contemplated that the compound of this invention may be employed to form biologically active ingredients which can be employed as essential components in various compositions including diluents, extenders, fillers, conditioners, solvents and the like, and various clays, diatomaceous earth, talc, spent catalyst, alumina silica materials and such liquids as water, and various organic materials such as acetone, kerosene, benzene, toluene, xylene and other petroleum distillate fractions or mixtures thereof. Where liquid formulations are employed or dry materials prepared which are to be employed in liquid form, it is desirable in certain instances additionally to employ a wetting, emulsifying or surface-active agent to facilitate use of the formulation, e. g., Triton X–155 (alkyl aryl polyether alcohol).

The term "carrier" as employed throughout the specification and claims is intended to refer to the material generally used as a major proportion of a biologically active or other formulation embodying the compound of this invention. Hence, it will be appreciated that the term "carrier" includes finely-divided materials, both liquid and solid, conventionally employed in preparing formulations. These materials may include both substantially inert low cost materials as well as, in certain instances, other active ingredients.

It is to be understood that although the invention has been described with specific reference to particular embodiments thereof, it is not to be so limited, since changes

What is claimed is:

1. The compound 2-piperonyloxazolidine.

2. The method of preparing 2-piperonyloxazolidine which comprises chemically combining piperonal and monothenolamine by heating these reactants.

3. The method of preparing 2-piperonyloxazolidine which comprises combining piperonal, ethanolamine and an organic solvent and refluxing this mixture.

4. The method of controlling spore germination fungi which comprises employing 2-piperonyloxazolidine.

5. The method of controlling the growth of microorganisms which comprises employing 2-piperonyloxazolidine as an active toxicant material.

6. A biologically active composition which includes as an essential active ingredient a minor amount of 2-piperonyloxazolidine and a major proportion of a carrier.

7. The method of preparing 2-piperonyloxazolidine which comprises refluxing a mixture of about equimolecular proportions of piperonal and ethanolamine in butanol and thereafter removing the butanol from the reaction mixture.

References Cited in the file of this patent

Takayi et al.: Chem. Abstracts, vol. 48, col. 12,022 (1954).

UNITED STATES PATENT OFFICE
Certificate of Correction

September 16, 1958

Patent No. 2,852,427

Jamal S. Eden

It is hereby certified that error appears in the above numbered patent requiring correction and that the said Letters Patent should read as corrected below.

In the heading to the printed specification, line 2, for "2-PIPERONYLOXAZOLIDINE" read —2-(3,4-METHYLENEDIOXYPHENYL)-1,3-OXAZOLIDINE—; in the printed specification, column 1, line 15, column 3, lines 5, 6, 9, and 13, and column 4, lines 1 and 2, 4 and 5, and 6, for "2-piperonyloxazolidine" read —2-(3,4-methylenedioxyphenyl)-1,3-oxazolidine—; column 1, line 41, for "*2-piperonyloxazolidine*" read —"*2-(3,4-methylenedioxyphenyl)-1,3-oxazolidine*—.

Signed and sealed this 21st day of April 1959.

[SEAL]

Attest:
KARL H. AXLINE,
*Attesting Officer.*

ROBERT C. WATSON,
*Commissioner of Patents.*